US011537840B2

(12) United States Patent
Pau et al.

(10) Patent No.: US 11,537,840 B2
(45) Date of Patent: Dec. 27, 2022

(54) METHOD, SYSTEM, AND COMPUTER PROGRAM PRODUCT TO EMPLOY A MULTI-LAYERED NEURAL NETWORK FOR CLASSIFICATION

(71) Applicant: STMICROELECTRONICS S.r.l., Agrate Brianza (IT)

(72) Inventors: Danilo Pietro Pau, Sesto San Giovanni (IT); Emanuele Plebani, Sotto il Monte Giovanni (IT); Fabio Giuseppe De Ambroggi, Biassono (IT); Floriana Guido, Milan (IT); Angelo Bosco, Giarre (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 558 days.

(21) Appl. No.: 16/189,264

(22) Filed: Nov. 13, 2018

(65) Prior Publication Data

US 2019/0147338 A1    May 16, 2019

(30) Foreign Application Priority Data

Nov. 15, 2017   (IT) ................ 102017000130480

(51) Int. Cl.
*G06N 3/04*   (2006.01)
*G06N 3/08*   (2006.01)
(Continued)

(52) U.S. Cl.
CPC ............. *G06N 3/04* (2013.01); *G06N 3/0454* (2013.01); *G06N 3/063* (2013.01); *G06N 3/08* (2013.01); *G06N 5/003* (2013.01)

(58) Field of Classification Search
CPC combination set(s) only.
See application file for complete search history.

(56) References Cited

U.S. PATENT DOCUMENTS 9,174,123 B2    11/2015  Nasiri et al.
10,311,342 B1*   6/2019  Farhadi ................ G06N 3/084
(Continued)

FOREIGN PATENT DOCUMENTS

CN       102725712 A    10/2012
EP       3 301 611 A1    4/2018
WO    WO 2017114578 A1   7/2017

OTHER PUBLICATIONS

Rastegari et al., "XNOR-Net: ImageNet Classification Using Binary Convolutional Neural Networks," The 18th International Conference on Medical Imaging Computing and Computer-Assisted Intervention, Munich, Germany, Oct. 5-9, 2015, pp. 525-542. (IDS Dec. 4, 2018, NPL document 20) (Year: 2015).*
(Continued)

*Primary Examiner* — Brian M Smith
*Assistant Examiner* — Asher H. Jablon
(74) *Attorney, Agent, or Firm* — Seed IP Law Group LLP

(57) ABSTRACT

A neural network classifies an input signal. For example, an accelerometer signal may be classified to detect human activity. In a first convolutional layer, two-valued weights are applied to the input signal. In a first two-valued function layer coupled at input to an output of the first convolutional layer, a two-valued function is applied. In a second convolutional layer coupled at input to an output of the first two-valued functional layer, weights of the second convolutional layer are applied. In a fully-connected layer coupled at input to an output of the second convolutional layer, two-valued weights of the fully connected layer are applied. In a second two-valued function layer coupled at input to an output of the fully connected layer, a two-valued function of the second two-valued function layer is applied. A classifier classifies the input signal based on an output signal of second two-valued function layer.

21 Claims, 5 Drawing Sheets

(51) Int. Cl.
G06N 5/00 (2006.01)
G06N 3/063 (2006.01)

(56) References Cited

U.S. PATENT DOCUMENTS

| | | | |
|---|---|---|---|
| 2003/0093162 | A1 | 5/2003 | Gutta et al. |
| 2012/0225719 | A1 | 9/2012 | Nowozin et al. |
| 2016/0077166 | A1 | 3/2016 | Morozov et al. |
| 2016/0283783 | A1 | 9/2016 | Yang et al. |
| 2018/0089586 | A1 | 3/2018 | Pau et al. |
| 2018/0121764 | A1* | 5/2018 | Zha .................. G06K 9/6267 |
| 2018/0189466 | A1 | 7/2018 | Raviv et al. |

OTHER PUBLICATIONS

McClelland et al., "The Appeal of Parallel Distributed Processing," in Parallel Distributed Processing: Explorations in the Microstructure of Cognition: Foundations , MIT Press, 1987, pp. 3-44. (Year: 1987).*
Freescale Semiconductors, Inc. "MMA7260QT Rev. 5." 2008. p. 4. (Year: 2008).*
Krassnig et al. "User-friendly system for recognition of activities with an accelerometer." 2010 4th International Conference on Pervasive Computing Technologies for Healthcare. IEEE, 2010. (Year: 2010).*
Cao et al. "An integrated framework for human activity recognition." 2012. In UbiComp '12: Proceedings of the 2012 ACM Conference on Ubiquitous Computing, pp. 621-622. (Year: 2012).*
Yang et al. "Deep Convolutional Neural Networks On Multichannel Time Series For Human Activity Recognition." 2015. In IJCAI 2015, pp. 3995-4001 (Year: 2015).*
Rastegari et al., "XNOR-Net: ImageNet Classification Using Binary Convolutional Neural Networks," arXiv:1603.05279v4 [cs.CV], 2016, 17 pages (Year: 2016).*
Ha et al. "Convolutional neural networks for human activity recognition using multiple accelerometer and gyroscope sensors." 2016 International Joint Conference on Neural Networks (IJCNN). IEEE, 2016. (Year: 2016).*
Ghasemzadeh et al. "ResBinNet: Residual Binary Neural Network." Nov. 3, 2017. arXiv:1711.01243v1. 10 pages (Year: 2017).*
Krizhevsky et al., "ImageNet Classification with Deep Convolutional Neural Networks," In: Advances in Neural Information Processing Systems 25 (NIPS 2012), 9 pages, Retrieved from https://proceedings.neurips.cc/paper/2012 (Year: 2012).*
Okeyo, et al., "Data Segmentation for Real-time Activity Recognition", *Computer Science Research Institute, School of Computing and Mathematics*, 2014, 20 pages.
Ordonez, et al., "Deep Convolutional and LSTM Recurrent Neural Networks for Multimodal Wearable Activity Recognition", *Sensors*, vol. 16(115), 2016, 25 pages.
Zhu et al., "Human Daily Activity Recognition in Robot-assisted Living Using Multi-sensor Fusion," IEEE International Conference on Robotics and Automation, Kobe, Japan, May 12-17, 2009, pp. 2154-2159.
Ardunino, "Ardunino & Genuino Products—Arduino 101 & Genuine 101," 2016, retrieved from https://www.arduino.cc/en/Main/ArduinoBoard101 on Aug. 1, 2016, 4 pages.
Bulling et al., "A Tutorial on Human Activity Recognition Using Body-Worn Inertial Sensors," *ACM Computing Surveys* 46(3):Article 33, Jan. 2014, 33 pages.
Chen et al., "Assessing impacts of data volume and data set balance in using deep learning approach to human activity recognition," *IEEE International Conference on Bioinformatics and Biomedicine*, Kansas City, Missouri, Nov. 13-16, 2017, 20 pages.
Clarke, "Startup's Tech is Intel's Quark Neural Network," *EE Times*, Jul. 26, 2015, retrieved from http://www.eetimes.com/document.asp?doc_id-1326977&print=yes on Aug. 1, 2016, 3 pages.

Courbariaux et al., Binarized Neural Networks: Training Neural Networks with Weights and Activations Consliained to +1 or −1 arXiv:1602.02830v3, Mar. 17, 2016, 11 pages.
Courbariaux et al., "BinaryConnect: Training Deep Neural Networks with binary weights during propagations," *NIPS 2015, Neural Information Processing Systems*, Montréal, Canada, Dec. 7-12, 2015, pp. 3123-3131.
Dieleman, "Recommending music on Spotify with deep learning," *Sander Dieleman Blog*, Aug. 5, 2014, retrieved from http://benanne.github.io/2014/08/05/spotify-cnns.html on Aug. 1, 2016, 16 pages.
European Search Report and Written Opinion, dated Feb. 2, 2018 for corresponding European application No. 17193073.8, 9 pages.
General Vision, "CM1K Hardware User's Manual—Version 4.0.2," revised May 27, 2016, 54 pages.
General Vision, "Products—CurieNeurons Librairies for the Arduino/Genuino 101—Unleash the power of the 128 neurons of the Intel Curie module for learning and recognition," 2016, retrieved from https://www.general-vision.com/products/ on Aug. 1, 2016, 6 pages.
Goodfellow et al., "Maxout Networks," arXiv: 1302.4389v4, Sep. 20, 2013, 9 pages.
Grzeszick et al., "Deep Neural Network based Human Activity Recognition for the Order Picking Process," *Proceedings of the 4th International Workshop on Sensor-based Activity Recognition and Interaction*, Rostock, Germany, Sep. 21-22, 2017, 6 pages.
Intel Corporation, "Intel® Curie™ Module: Unleashing Wearable Computing Innovation," retrieved from http://www.intel.com/content/www/us/en/wearables/wearable-soc.html on Aug. 1, 2016, 5 pages.
InvenSense, "ICM-30630—World's First Tri-Core 6-Axis MotionTracking Solution with Integrated Sensor-Hub Framework Software," 2016, retrieved from https://www.invensense.com/products/motion-tracking/6-axis/icm-30630-2/ on Aug. 1, 2016, 6 pages.
Lee et al., "Generalizing Pooling Functions in Convolutional Neural Networks: Mixed, Gated, and Tree," *The 19th International Conference on Artificial Intelligence and Statistics* Cadiz, Spain, May 9-11, 2016, pp. 464-472.
Lin et al., "Network In Network," arXiv: 1312.4400v3, Mar. 4, 2013, 10 pages.
McDanel et al., "Embedded Binarized Neural Networks," *International Conference on Embedded Wireless Systems and Networks*, Uppsala, Sweden, Feb. 20-22, 2017, pp. 168-173.
Nesterov, "A Method of Solving a Convex Programming Problem with Convergence Rate $O(1/k^2)$," *Soviet Mathematics Doklady* 27(2):312-276, 1983.
Ordóñez et al., "Deep Convolutional and LSTM Recurrent Neural Networks for Multimodal Wearable Activity Recognition," *Sensors* 16(1): 115, 25 pages.
Rastegari et al., "XNOR-Net: ImageNet Classification Using Binary Convolutional Neural Networks," *The 18th International Conference on Medical Imaging Computing and Computer-Assisted Intervention*, Munich, Germany, Oct. 5-9, 2015, pp. 525-542. (17 pages).
Reyes-Ortiz et al., "Transition-Aware Human Activity Recognition Using Smartphones," *Neurocomputing* 171:754-767, 2015. (30 pages).
Shoaib et al., Toward Physical Activity Recognition Using Smartphone Sensors, *IEEE 10th International Conference on Ubiquitous Intelligence & Computing and 10th IEEE International Conference on Autonomic & Trusted Computing*, Vietri sul Mare, Italy, Dec. 18-20, 2016, 8 pages.
STMicroelectronics, "UM1936 User Manual—Getting started with osxMotionAR activity recognition library for X-UCBE-MEMS1 expansion for STM32Cube," Jan. 2016, 47 pages.
Ulanoff, "Tiny Intel Curie may power wearables, but first let's make a robot," *Mashable*, Oct. 16, 2015, retieved from http://mashable.com/2015/10/16/intel-curie-may-power-wearables-but-let-me-make-a-robot/#MOIKZtDnZkqj#MOIKZ on Aug. 1, 2016, 2 pages.
Wikipedia, "Autoregressive-moving-average model," downloaded on Nov. 27, 2018 from https://en.wikipedia.org/wiki/Autoregressive%E2%80%93moving-average_model, 6 pages.
Wikipedia, "Rodrigues' rotation formula," downloaded on Nov. 27, 2018, from https://en.wikipedia.org/wiki/Rodrigues%27_rotation_formula, 5 pages.
Wikipedia, "Softmax function," downloaded on Nov. 27, 2018, from https://en.wikipedia.org/wiki/Rodrigues%27_rotation_formula, 6 pages.

(56) References Cited

OTHER PUBLICATIONS

Krishnan et al., "Activity recognition on streaming sensor data," Pervasive and Mobile Computing 10 (2014), Apr. 12, 2012, pp. 138-154.
Krizhevsky et al., "The CIFAR-10 dataset," URL=https://www.cs.toronto.edu/~kriz/cifar.html, download date Nov. 27, 2017, (4 pages).
LeCun et al., "The MNIST Database of handwritten digits," URL=http://yann.lecun.com/exdb/mnist/, download date Nov. 27, 2017 (7 pages).
"The Street View House Numbers (SVHN) Dataset," URL=http://ufldl.stanford.edu/housenumbers/, download date Nov. 27, 2017 (2 pages).
Paul Werbos, Beyond regression: New tools for predicting and analysis in the behavioral sciences, 1974.

\* cited by examiner

METHOD, SYSTEM, AND COMPUTER PROGRAM PRODUCT TO EMPLOY A MULTI-LAYERED NEURAL NETWORK FOR CLASSIFICATION

BACKGROUND

Technical Field

The description relates to signal processing methods.

One or more embodiments may apply, for instance, to the recognition of human activity.

Description of the Related Art

Multi-axial accelerometers for integration in a package, possibly together with a gyroscope, are currently produced in massive quantities.

Prevailing trends in that area are directed towards bringing Artificial Intelligence (A.I.). capabilities into sensors, while ensuring ultra-low power sensing (e.g., in the microWatt range) with aggressive area shrinking (e.g., 68%), which will facilitate improving return on net assets (RONA) and meeting increased price pressures.

Improvements are thus desirable, possibly by resorting to A.I. "close to the sensor," as A.I. is centralized today on powerful remote cloud servers. Intelligence means, e.g., the capability for a system to self-learn and self-adapt to time-varying real sensed physical phenomena.

Shifting part of the intelligence from the cloud into sensors may thus represent a goal to pursue, and the capability of integrating, e.g., deep-learning neural networks may contribute in providing technological added value to sensor products and their applications while also mitigating excessive workloads concentrated into servers and excessive raw data rates on the communication networks between sensors and servers.

BRIEF SUMMARY

In an embodiment, a method, comprises: applying, in a first convolutional layer of a neural network, two-valued weights of the first convolutional layer to an input signal of the first convolutional layer; applying, in a first two-valued function layer of the neural network coupled at input to an output of the first convolutional layer, a two-valued function of the first two-valued function layer; applying, in a second convolutional layer of the neural network coupled at input to an output of the first two-valued functional layer, weights of the second convolutional layer; applying, in a fully-connected layer of the neural network coupled at input to an output of the second convolutional layer, two-valued weights of the fully connected layer; applying, in a second two-valued function layer of the neural network coupled at input to an output of the fully connected layer, a two-valued function of the second two-valued function layer; and classifying, using a classifier of the neural network coupled at input to an output of the second two-valued function layer, the input signal based on an output signal of second two-valued function layer. In an embodiment, the method comprises: applying, using a normalization layer of the neural network coupled between the first convolutional layer and the first two-valued function layer, normalization to an output signal of the first convolutional layer. In an embodiment, the method comprises: applying, using a normalization layer of the neural network coupled between the fully-connected layer and the second two-valued function layer, normalization to an output signal of the fully-connected layer. In an embodiment, the applying two-valued weights in the first convolutional layer comprises applying a set of filters to the input signal, generating respective filtered output signals. In an embodiment, the applying weights in the second convolutional layer comprises applying a set of filters to the signal from the first neural network processing and the method comprises, in the second convolutional layer, adding together outputs from the filters in the set of filters, generating respective single values. In an embodiment, the method comprises: applying, using a max pooling layer coupled between the second convolutional layer and the fully-connected layer, max pooling to an output of the second convolutional layer. In an embodiment, the classifying comprises applying softmax classification. In an embodiment, the method comprises: applying pre-neural network processing to an acceleration signal, generating the input signal of the first convolutional layer, the pre-neural network processing including filtering to separate a dynamic acceleration component from a gravity component of the acceleration signal. In an embodiment, the filtering to separate the dynamic acceleration component from the gravity component comprises one of infinite impulse response filtering or exponential moving averaging. In an embodiment, the pre-neural network processing includes: applying a gravitational rotation to the filtered acceleration signal. In an embodiment, the method comprises: applying post-neural network processing to an output of the classifier, the post-neural network processing including at least one of: temporal filtering to remove mis-classification errors; and heuristic filtering. In an embodiment, the weights of the second convolutional layer are two-valued weights.

In an embodiment, a device comprises: a first convolutional layer of a neural network, which, in operation, applies two-valued weights of the first convolutional layer; a first two-valued function layer of the neural network coupled at input to an output of the first convolutional layer, wherein the first two-valued function layer, in operation, applies a two-valued function of the first two-valued function layer; a second convolutional layer of the neural network coupled at input to an output of the first two-valued functional layer, wherein the second convolutional layer in operation, applies weights of the second convolutional layer; a fully-connected layer of the neural network coupled at input to an output of the second convolutional layer, wherein the fully connected layer, in operation, applies two-valued weights of the fully connected layer; a second two-valued function layer of the neural network coupled at input to an output of the fully connected layer, wherein the second two-valued function layer, in operation, applies a two-valued function of the second two-valued function layer; and a classifier of the neural network coupled at input to an output of the second two-valued function layer, wherein the classifier, in operation, classifies an input signal to the first convolutional layer based on an output signal of second two-valued function layer. In an embodiment, the device comprises: a normalization layer of the neural network coupled between the first convolutional layer and the first two-valued function layer, wherein the normalization layer, in operation, normalizes an output signal of the first convolutional layer. In an embodiment, the device comprises: a second normalization layer of the neural network coupled between the fully-connected layer and the second two-valued function layer, wherein the second normalization layer, in operation, normalizes an output signal of the fully-connected layer. In an embodiment, the first convolutional layer comprises a set of filters, which, in operation, generate respective filtered signals. In an embodiment, the second convolutional layer comprises a set of filters coupled to an adder. In an embodiment, the device comprises: a max pooling layer coupled between the second convolutional layer and the fully-connected layer.

In an embodiment, a system comprises: an input; and digital signal processing circuitry, coupled to the input, wherein the digital signal processing circuitry, in operation, implements a neural network comprising: a first convolutional layer which, in operation, applies two-valued weights to the input signal; a first two-valued function layer, which, in operation, applies a first two-valued function to an output of the first convolutional layer; a second convolutional layer, which, in operation, applies weights to an output of the first two-valued function layer; a fully-connected layer coupled to the second convolutional layer, which, in operation, applies two-valued weights to an input of the fully connected layer; a second two-valued function layer, which, in operation, applies a two-valued function to an output of the fully connected layer; and a classifier, which, in operation, classifies a signal received by the input based on an output signal of second two-valued function layer. In an embodiment, the digital signal processing circuitry, in operation: normalizes the output of the first convolutional layer provided to the first two-valued function layer; adds components of an output of the second convolutional layer, generating the input to the fully-connected layer; and normalizes the output of the fully-connected layer provided to the second two-valued function layer. In an embodiment, the system comprises: pre-neural network processing circuitry coupled to the input, the pre-neural network processing circuitry including a filter and a gravitational rotator. In an embodiment, the system comprises: post-neural network processing circuitry coupled to the input, the post-neural network processing circuitry including a temporal filter and a heuristic filter. In an embodiment, the system comprises an accelerometer. In an embodiment, the system comprises: a gyroscope. In an embodiment, the system comprises a chip including the digital signal processing circuitry and the accelerometer.

In an embodiment, a non-transitory computer-readable medium has contents which configure digital signal processing circuitry to implement a neural network, the neural network comprising: a first convolutional layer which, in operation, applies two-valued weights to an input signal; a first two-valued function layer coupled at input to an output of the first convolutional layer, and which, in operation, applies a first two-valued function; a second convolutional layer coupled at input to an output of the first two-valued function layer, and which, in operation, applies weights; a fully-connected layer coupled at input to an output of the second convolutional layer, and which, in operation, applies two-valued weights; a second two-valued function layer coupled at input to an output of the fully connected layer, and which, in operation, applies a two-valued function; and a classifier, which, in operation, classifies the input signal based on an output of second two-valued function layer. In an embodiment, the contents comprises instructions executed by the digital signal processing circuitry. In an embodiment, the instructions, when executed by the digital signal processing circuitry, cause the digital signal processing circuitry to filter the input signal provided to the first convolutional layer.

One or more embodiments may comprise a computer program product loadable in the memory of at least one processing circuit (e.g., a computer) and comprising software code portions for executing the steps of the method when the product is run on at least one processing circuit. As used herein, reference to such a computer program product is understood as being equivalent to reference to a computer-readable medium containing instructions for controlling the processing system in order to co-ordinate implementation of the method according to one or more embodiments. Reference to "at least one computer" is intended to highlight the possibility for one or more embodiments to be implemented in modular and/or distributed form.

One or more embodiments may provide a hybrid binary neural network circuit suited for performing, e.g., accelerometer activity classification.

In one or more embodiments, weights can be two-valued, e.g., either +1 or −1 (or possibly other pairs of values such as 0, 1), while the achievement of high accuracy is facilitated by enumerating with few values (possibly quantizing into a lower number of bits than floating point precision) neuron activations only in certain sections of the network.

A network according to embodiments can be trained in a supervised fashion, possibly by resorting to open-source training tools, with tools such as Keras, Lasagne, Tensorflow, CNTK, Caffe and the like representing cases in point.

A neural network circuit according to embodiments can receive accelerometer signals from a measuring device and identify via a classifier a corresponding activity being performed, e.g., by a wearer of the device.

In one or more embodiments, such a network can accommodate processing of combined accelerometer and gyroscope input.

One or more embodiments may facilitate achieving high accuracy in recognizing numerous classes, with complexity and power consumption reduced to a level possibly well below the level of the sensor itself.

Features of embodiments may comprise a scalable number of neurons and improved neuron inner architecture, which admits software implementation by means of microprocessors and/or DSPs with very low power consumption, possibly with dedicated hardware accelerators and/or specific instructions to accelerate execution of the layers and neurons comprised in the network itself.

One or more embodiments may facilitate providing artificial neural networks combining (very) low power consumption with the capability of classifying adequately human activities as sampled via an accelerometer and optionally a gyroscope.

Possible fields of application of corresponding (e.g., sensor) systems may comprise mobile communications, the automotive sector, robotics, various industrial and agricultural applications, wearable devices, safety-critical infrastructure monitoring and Internet-of-Things domains.

One or more embodiments permit customers/users to train neural networks on which open source training tools are installed and run and then deploy neural networks circuits in (ultra) low power (e.g., fraction of always-on sensors.

One or more embodiments may facilitate avoiding the possible sharing of proprietary customer data during the learning phases of neural networks on both high power consumption (e.g., x86) computers and GPUs.

One or more embodiments may demonstrate accuracy levels (evaluated on the basis of average recall) in the range of at least 97.5% on five classes of human activity, with complexity (conservatively) evaluated at 25 Kops per second @16 Hz with an input window shifted by 16 samples acquired by the sensors; this figure may be further lowered by about ⅓ to a power consumption of about 0.5 μW in an active low-power mode with a minimum power supply of 1.62 V, well below the power consumption of the (already low-power) sensor itself.

BRIEF DESCRIPTION OF THE SEVERAL VIEWS OF THE DRAWINGS

One or more embodiments will now be described, by way of example only with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

A neural network can be defined a two-valued one if both weights and activations are constrained to be enumerated with 2 numbers, e.g, either +1 or −1 at run and training time (during which parameter gradients are computed). This approach can drastically reduce memory size and associated accesses, with most arithmetic operations replaced with narrow bit-wise operations.

In the literature, an early example of such a neural network can be found in Courbariaux, M. et al.: "Binary-connect: Training deep neural networks with binary weights during propagation," Advances in Neural Information Processing System, 2015.

There, a neural network is discussed where binarized weights are used during both training and testing phases.

An example of a fully binary network (weights and activations) is provided by the Binarized Neural Network (BNN) also proposed by Courbariaux, M. et al. in: "Binarized neural networks: Training deep neural networks with weights and activations constrained to +1 or −1." arXiv preprint arXiv: 1602.02830 (2016).

Figure 1:
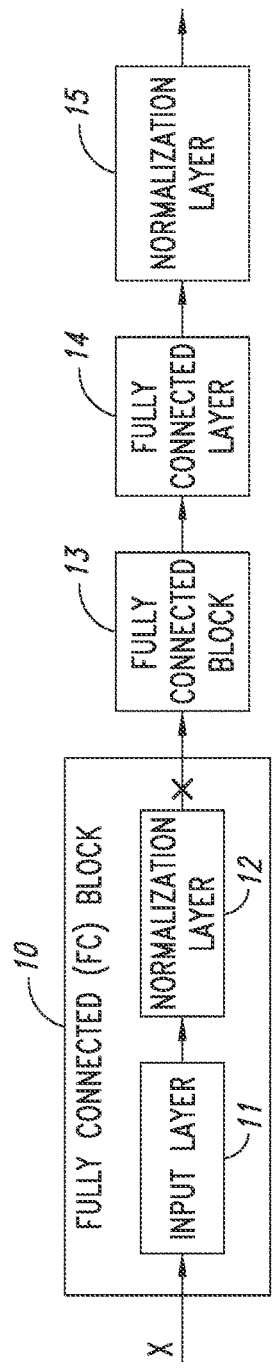
FIG. 1 is a block diagram exemplary of a MultiLayer Perceptron (MLP) neural network.

In their experiments, Courbariaux et al. refer to a MultiLayer Perceptron (MLP) network as exemplified in FIG. 1 and comprising:
a fully connected (FC) block 10 comprising a fully connected input layer 11 receiving an input x, followed by a normalization layer 12,
a fully connected block 13 repeated N times (xN),
another fully connected layer 14 followed by a normalization layer 15 providing an output y.

The crosses in FIG. 1 are representative of the result of binarization of activations.

As is well known in computational networks, the activation function (out=f(in)) of a node defines the output of that node given an input or set of inputs. In artificial neural networks this function is also called the transfer function (out=f(in)).

The FC (Fully Connected) block 13 is repeated a number of times N equal to the number of hidden layers in the network, e.g., N=3.

Figure 2:
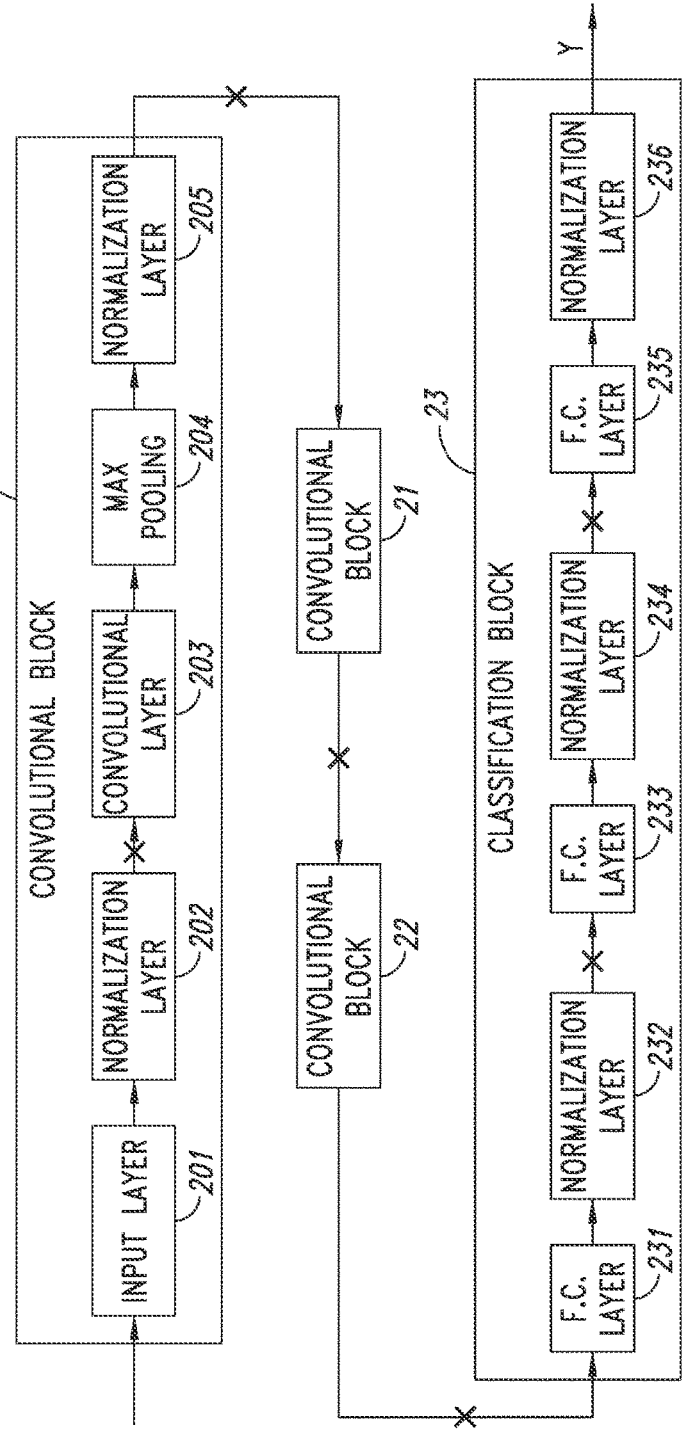
FIG. 2 is a block diagram exemplary of a convolutional neural network (ConvNet)

Courbariaux et al. also refer to a Convolutional Network (ConvNet) as exemplified in FIG. 2 and comprising:
a first convolutional block 20, in turn comprising an input convolutional layer 201 receiving an input x, followed by a cascaded arrangement of a normalization layer 202 (with a cross representing the binarization of activations), a convolutional layer 203, a max pooling layer 204 and a normalization layer 205, with another cross represents the binarization of activations,
two further convolutional blocks 21 and 22, each one followed by a cross representing the binarization of activations, and
a classification block 23, in turn comprising a fully connected layer 231 followed by a cascaded arrangement of a normalization layer 232 (with a cross to represent the binarization of activations), a fully connected layer 233, a normalization layer 234 (with a cross to represent the binarization of activations), a fully connected layer 235 and a normalization layer 236 providing an output y.

The convolutional block structure may differ for the number of filters applied in the convolutional layer.

Courbariaux et al. trained the network of FIG. 1 on the MNIST dataset of handwritten digits (as available at a website represented as <<http:>> <</>> <</>> <<yann.lecun.com>> <</>> <<exdb>> <</>> <<mnist>> <</>>) and the network of FIG. 2 on CIFAR-10 (see, e.g., a website represented as <<https:>> <</>> <</>> <<www>> <<.>> <<cs.toronto.edu>> <</>>-kriz>> <</>> <<cifar>> <<.>> <<html>>>) with 10 image classes and SVHN (Street View House Numbers—see, e.g., a website represented as <<http:>> <</>> <</>> <<ufldl.stanford.edu>> <</>> <<housenumbers>> <</>>) image datasets.

Test error rates documented with comparable network architectures are 0.94% on the MNIST image dataset (see, e.g., Goodfellow, Ian J. et al.: "Maxout Networks", arXiv preprint arXiv: 1302.4389 (2013)), 1.69% on SVHN images (see, e.g., Lin, Min et al.: "Network in network", arXiv preprint arXiv: 1312.4400 (2013)) and 7.62% on CIFAR-10 images (see, e.g., Lee, Chen-Yu et al. "Generalizing pooling functions in convolutional neural networks: Mixed, gated, and tree", International conference on artificial intelligence and statistic. 2016).

It is noted that Courbariaux et al. achieved results very close to those cited by way of comparison: 0.96% on MNIST images, 2.53% on SVHN images and 10.15% on CIFAR-10 images.

The type of networks proposed by Courbariaux et al. may thus facilitate decreasing complexity and memory by paying a price in terms of accuracy, e.g., up to 10.15% on CIFAR-10 images.

It is otherwise noted that satisfactory results obtained in experiments in image classification and with benchmark datasets may translate into inadequate performance of the same procedures if applied to human activity recognition (briefly, HAR) that processes data acquired by an accelerometer and not by an imager, because of the very different nature of the input data (accelerations vs pixels).

As discussed in the following, if applied to recognizing a dataset composed by classes of different human activities (HAR) sampled with accelerometer data, pipelines as depicted in FIGS. 1 and 2 may provide levels of accuracy that are (very far) below desirable values of 95% and higher which are instead desirable for HAR applications.

One or more embodiments may address the HAR accuracy problem by means of a pipeline comprising a neural pipeline which may integrate two-valued layers, normalization layers and max pooling layers in a sort of hybrid arrangement which may distinguish over prior arrangements, for example, as follows:
- one or more embodiments may go beyond conventional arrangements comprising, e.g., two convolutional layers and two fully connected layers, with less memory required to hold parameters and less computational complexity;
- weights may be constrained to be two-valued (enumerated by 2 numbers) e.g., either +1 or −1, while, in order to facilitate achieving a desired accuracy, activations are two-valued only where desirable, e.g., in some complex layers where they facilitate reducing execution time and lead to a simpler hardware implementation. Moreover, activations may also be enumerated with two values in some layers to help achieving a desired accuracy and lower complexity, while avoiding to apply two-value enumeration for all network activations in any arbitrary manner.

One or more embodiments may thus provide a hybrid neural network (HNN) in a pipeline which may comprise also pre-processing and post-processing phases.

Figure 7:
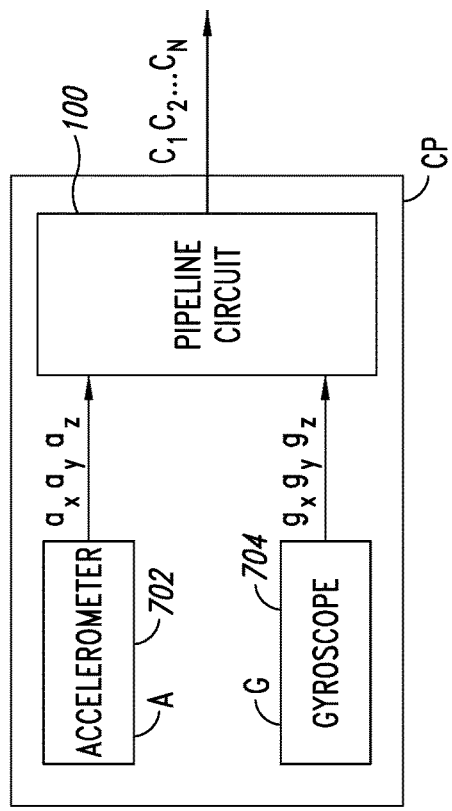
FIG. 7 is an exemplary block diagram of a system according to embodiments.
Figure 9:
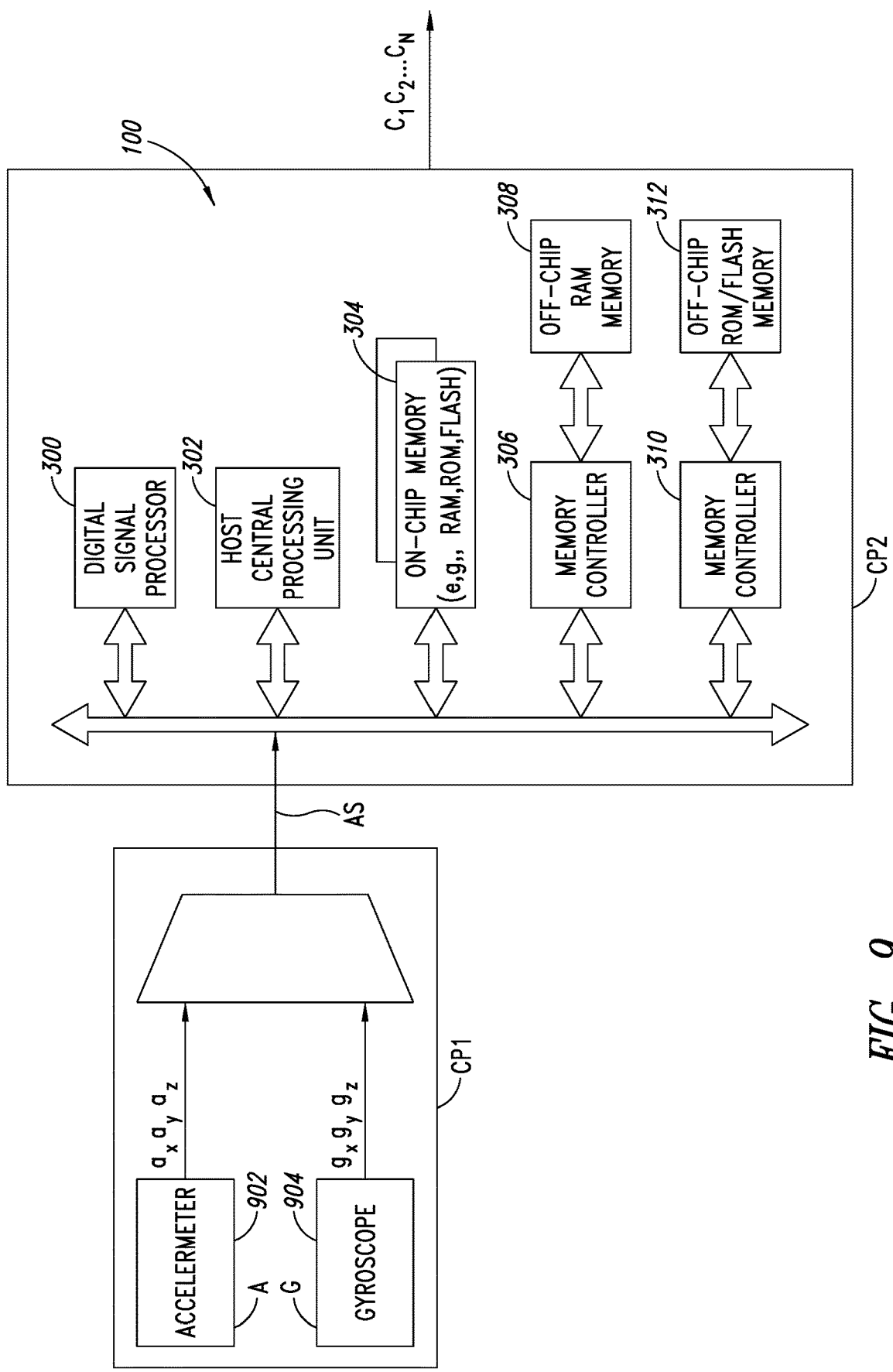
FIG. 9 is an exemplary block diagram of a system according to embodiments.

One or more embodiments may provide a procedure aimed at human activity recognition or HAR where input data (signal x) are acquired from an accelerometer A (plus possibly a gyroscope G), as visible, e.g., in FIGS. 7 and 9.

Figure 3:
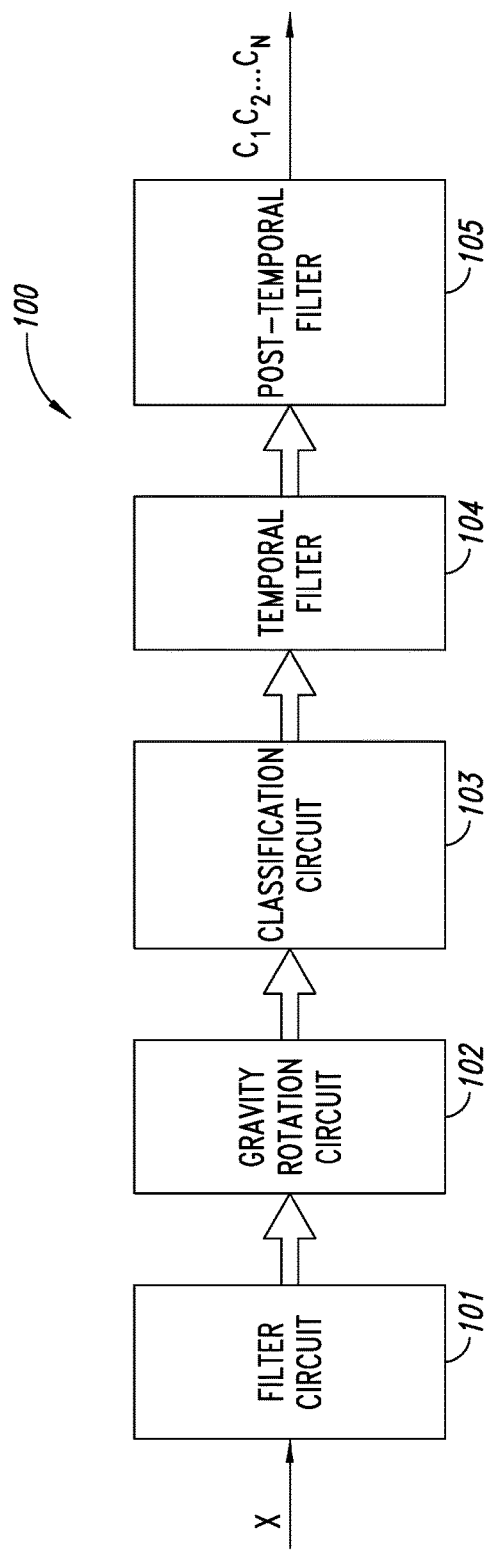
FIG. 3 is a block diagram exemplary of a pipeline as possibly used in embodiments.

FIG. 3 is exemplary of a corresponding pipeline circuit 100, suited to be implemented as discussed in the following and comprising:
- a pre-processing section or circuit comprising a filter 101 (e.g., an infinite impulse response—IIR filter or an exponential moving average—EMA to separate a dynamic acceleration component from gravity) and a gravity rotation—GR block or circuit 102 configured for rotating the output signal from the filter 101, e.g., in order to have gravity always on a same axis;
- a classification stage 103 based, e.g., on a hybrid neural network circuit as discussed in the following;
- a post-processing section or circuit comprising a temporal filter 104 to remove possible errors due to mis-classification and a post-temporal filter 105 (e.g., a heuristic filter) to correct systematic errors of predictions and/or correct transitions between classes.

Certain possible embodiments of the circuit blocks 101 to 105 in FIG. 3 will now be discussed by way of example.

In one or more embodiments, the filter 101 may comprise a (e.g., IIR) low-pass filter (e.g., of order 4) which separates the fast changing dynamic acceleration component (a) from a slowly changing gravity component (g).

As an alternative to such filtering, in order to remove the g component (so that the average is zero), an exponential moving average—EMA can be used, e.g.:

$$\hat{g}_t = \alpha x_t + (1-\alpha)\hat{g}_{t-1}$$

The associated coefficient can be defined experimentally so that for small values it may identify the average component (g acceleration). Therefore $$\hat{x}_t = x_t - \hat{g}_t;$$

so that such a filter shall behave as a high pass filter.

The gravity rotation block 102 may facilitate having g always oriented toward the bottom vertical side (conventionally defined as direction −z) e.g., by means of the Rodrigues rotation formula—see, e.g., a website represented as <<https:>> <</>> <</>> <<en.wikipedia.org>> <</>> <<wiki>> <</>> <<Rodrigues %27_rotation_formula>>-aligning z-axis to gravity:

$$g = \frac{g}{\|g\|} \quad \sin\theta = 1 - \frac{1}{g_z^2} \quad \cos\theta = -g_z \quad v = [-g_y, g_x, 0] \quad v = \frac{v}{\|v\|}$$

$$a' = a\cos\theta + (v \times a)\sin\theta + v \cdot a(1-\cos\theta)$$

where θ represents the rotation angle and v the rotation axis.

The (e.g., acceleration) signal obtained by pre-processing (at 101 and 102) the signal x and input to the neural network circuit 103 is indicated as AS.

Turning now for brevity to the elements downstream of the neural network circuit 103, the post-processing performed on the output signal OS from the neural network circuit 103 may comprise different approaches of filtering, e.g., in a temporal filter 104.

A simple approach for 104 is a voting filter, where a class which occurs more frequently in a temporal window is selected. If the temporal window is T steps long and $n_k$ is the number of predictions for class k, the selected class will be:

$$c = \max_k n_k$$

Various known prediction models return probabilities for each class which represent how likely the prediction is to be true. A more accurate approach is to average all the probabilities over the window and find only at that point the most likely class at the time t:

$$c(t) = \max_k \sum_{s=1}^{T} p_k(t-s)$$

The average may be implemented more efficiently by using an exponential average:

$$\hat{p}_k(t) = \alpha p_k(t) + (1-\alpha)\hat{p}_k(t-1)$$

where $\hat{p}$ is the currently estimated average and α is a coefficient representing the "inverse effective window length", e.g., if α=0.1 the average will roughly depend on the last 10 prediction samples. The value of α can also be adapted on the likelihood of the last prediction, using larger values for more confident predictions and smaller values for less confident predictions. In that case, a is an increasing function of the most likely prediction, that is:

$$a(t) = f\left(\max_k p_k(t)\right)$$

Such temporal filters work satisfactorily if the class does not change over a large temporal period, allowing the errors to average out, but may increase latency and introduce prediction errors near class transitions.

A different procedure may be used to independently estimate when a HAR regime change has occurred, e.g., by estimating an autoregressive moving average model (ARMA—see, e.g., a website represented as <<https:>> <</>> <</>> <<en.wikipedia.org>> <</>> <<wiki>> <</>> <<Autoregressive % E2%80%93moving-average model>>) on short "stretches" of data, which can be assumed to come from signals 5 belonging to a same class, and checking when the predictions exceed a given threshold:

$$\hat{y}(t)=a_1y(t-1)+\ldots+a_py(t-p) \ |\hat{y}(t)-y(t)|>thr$$

Alternatively, as the classifier will be less confident around HAR transitions, changes may be detected by searching short intervals where the filtered probabilities are all below a given threshold.

Once the changes have been detected, the temporal filters are aligned to the changes, e.g., by setting the value of T in order to fit the temporal window on homogeneous prediction signals.

Alternatively, one or more embodiments may adopt post-processing as exemplified, e.g., in U.S. patent application Ser. No. 15/280,463 to which European Patent Application No. 17193073.8 corresponds (essentially a median filtering, based on finite state automata —FSA).

While capable of removing transient errors as caused by noise or incorrect predictions, a temporal filter 104 as discussed may not have adequate knowledge about the problem and may not correct systematic estimation errors, such as a class predicted with much higher probability than others, because this introduces errors in the mean.

In order to reduce errors, one or more embodiments may adopt a heuristic filter as indicated at 105 in FIG. 3.

While such a heuristic filter can be applied to the raw predictions from the classifier 103, if cascaded to ("downstream") a temporal filter as 104 and after alignment on transition boundaries it may facilitate obtaining higher accuracy.

For instance, the transitions between one class (e.g., source such as jogging) and another (e.g., destination such as walking) may be confirmed only after a given number of predictions of the destination class over a temporal window have been found with the predictions over the maximum time interval over all the pairs stored in a queue.

The size of the temporal window and the number of confirmations may depend on the pair of classes (source, destination). For transitions which are deemed exceedingly unlikely or impossible (e.g., as revealed by post processing FSA, with, e.g., changing from source such as biking to destination such as driving in human activity recognition being a case in point) the number of confirmations required may be set to infinity.

In a simplified version, the map of window sizes and confirmation may depend only on the destination class.

In one or more embodiments, a heuristic filter 105 may exploit the fact that potential estimation errors may be known at training time from the confusion matrix, which shows for each pair of (predicted, ground truth) classes the percentage of predictions; ideally, a perfect classifier has a diagonal confusion matrix with all values equal to 1, while the other values equal to 0.

Given an interval between two detected changes, the filter may estimate the distribution of predictions over the interval, e.g., by counting the occurrences or by estimating the parameters of a multinomial distribution over the predictions. The mis-classification pairs (predicted, ground truth) that are known to occur from the confusion matrix and that have a probability higher than a threshold can be corrected by replacing the predicted class with the estimated ground truth class.

In one or more embodiments, the output from the filters 104, 105 may be a classification $C_1 C_2 \ldots C_N$ (corrected over the classification produced at 103) identifying a wearer's activity (e.g., stationary, walking, running, biking, driving) as a function of the input signal x as provided, e.g., from an accelerometer plus possibly a gyroscope and subjected to neural network processing in the network 103.

Figure 4:
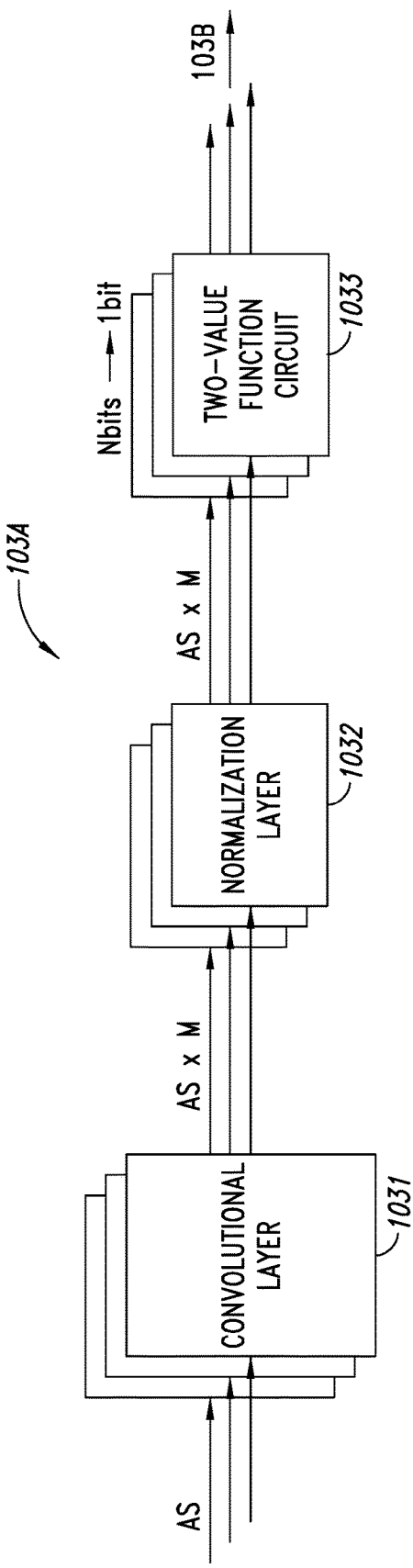
FIGS. 4 to 6 are block diagrams exemplary of possible details of embodiments of a convolutional neural network.
Figure 5:
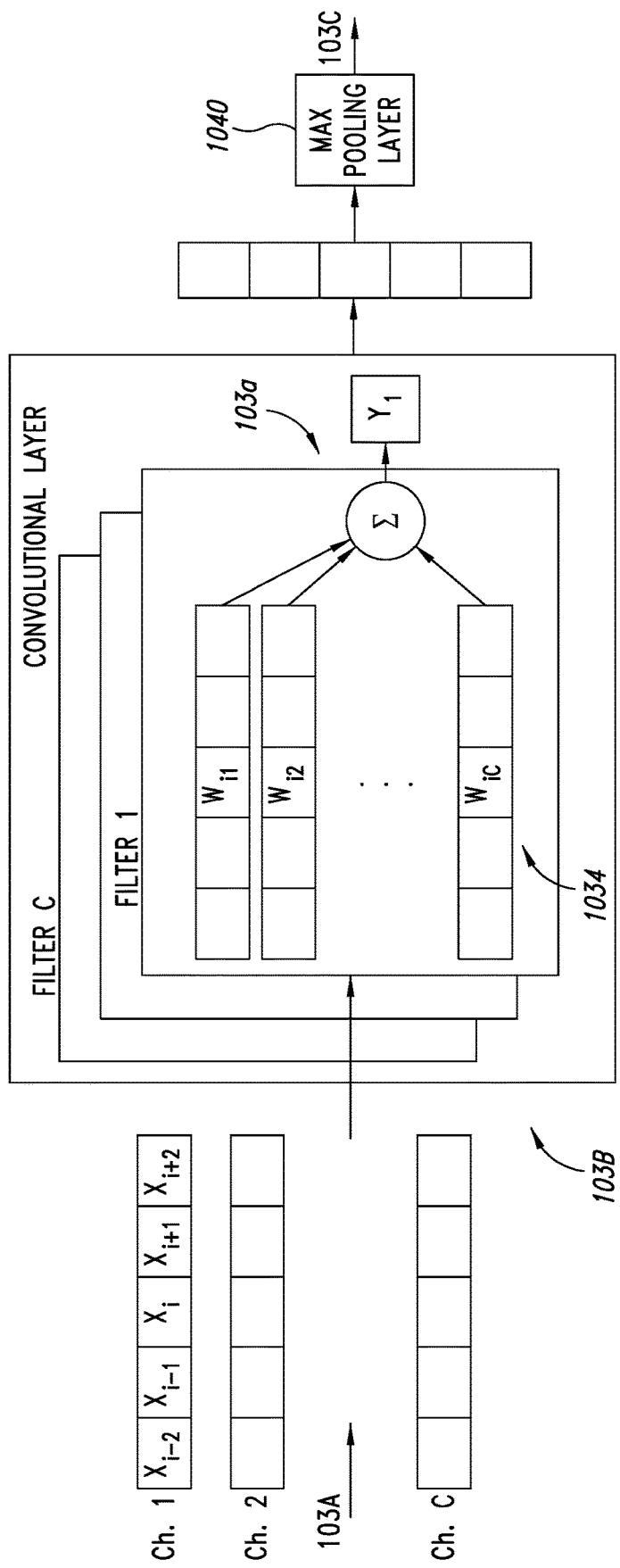
Figure 6:
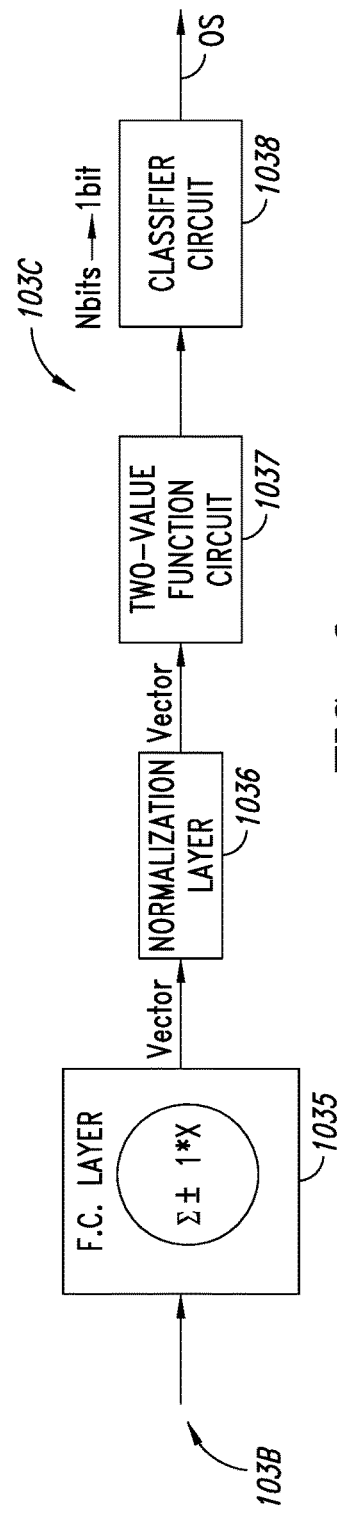

In one or more embodiments, the hybrid neural network (HNN) circuit 103 of FIG. 3 may comprise plural circuit stages or sections comprising two convolutional layers and two fully connected layers as depicted collectively in FIGS. 4, 5 and 6, with the circuit blocks in FIG. 5 assumed to follow those in FIG. 4 and the circuit blocks in FIG. 6 assumed to follow those in FIG. 5.

In the following description of possible exemplary embodiments, various "multi-valued" entities will be discussed, namely entities that can assume plural values, e.g., two, three, and so on, virtually any (positive) integer value. Certain entities (e.g., signals/weights/activations) will be expressly referred to as "two-valued" entities insofar as, in one or more embodiments, these latter entities may be intended to assume only two values (e.g., +1 or −1, +1 or 0, and so on), that is, may have a range of possible values limited to two values.

In FIG. 4 an example of a first section 103A of the network 103 is shown comprising a convolutional layer 1031 (receiving the components of the acceleration signal AS from the blocks 101 and 102 in FIG. 3), a normalization layer 1032 and a two-valued function/circuit 1033 which produces, starting from an Nbit signal, a 1 bit signal providing a two-valued signal to the stage or section 103B discussed in the following.

The acceleration signal AS supplied to the convolutional layer 1031 comprises, e.g., a three-dimensional time-varying signal measured with a tri-axial accelerometer, divided into windows of fixed length. Each axis of the input signal is processed separately.

The convolutional layer 1031 applies a set of C filters (each one represents a channel) with length k on the signal and returns C different outputs ASxM, equal in number to the filters, which are passed on to the normalization block 1032.

There, a mean (average) value, e.g., as computed during the neural network training phase, is subtracted from each sample. The mean values calculated are equal in number to the channels C.

The circuit block 1033 in the first stage 103A comprises a two-valued (e.g., Nbits >>>1 bit) function 1033 that returns as an output the sign of the input, e.g., +1 or −1.

The circuit block 1033 exemplified in FIG. 4 takes into account the fact that the input signal AS to the convolutional layer 1031 will not be enumerated with two values (e.g., will not be necessarily +1 or −1) and rather comprise multi-valued integers (e.g., enumerated with 16-bit or any other type of signal bit depth, such as 12-bit or 14-bit, depending on the implementation of the accelerometer output data bit-depth).

The presence of two-value enumerated weights in the layer 1031 may lead to appreciable savings in memory footprint (e.g., 32-bits or 64-bits floating point for the GPU implementation used to train the neural network, or 16-bit fixed point, for a possible hardwired implementation of the neural network, down to 1 bit per each weight) and memory reads/writes because costly floating and fixed point multiplications are replaced with simpler sign changes of the input.

This also facilitates hardware implementations without multipliers, which are a major source of complexity, and considering the area for implementing a multiplier (e.g., one third of the total area in a low power reduced instruction set DSP processor), silicon area costs are significantly reduced as well as power consumption.

In one or more embodiments, the second section 103B (FIG. 5) in the network 103 comprises a convolutional layer comprising plural filters 1034 (from 1 to C, C being a number of channels therein) which is followed by a max pooling layer 1040 (as discussed in the following).

FIG. 5 exemplifies the behavior of the second convolutional layer in the section 103B for the i-th sample. As noted, this layer comprises C (different) filters 1034, each in turn comprising a set of one-dimensional filters of length k. The one-dimensional filter outputs are added together as indicated at 103a, this resulting in respective single values $y_1$, $y_2$, ..., $y_C$ forwarded to the max pooling layer 1040 and on to the stage 103C in FIG. 6, with both the input and the output of the max pooling layer 1040 being multi-valued, that is capable of assuming more than two values.

In one or more embodiments, weights in the second section 103B are enumerated with two-values, so that, e.g., 16-bit fixed point multiply-accumulations can be replaced with 1-bit XNOR-bitcount operations, thereby substantially reducing the associated hardware complexity and offering the opportunity to exploit parallelization.

Also, the two-valued enumeration of the activations to the convolutional layer 1034 was found to have an appreciable impact on the second stage 103B where most operations (approximately 60%) are performed.

In one or more embodiments, the structure of the third section 103C (1035, 1036, 1037 and 1038 as exemplified in FIG. 6) in the network 103 is to some extent similar to the structure of the first section 103A.

In comparison to the first circuit section 103A, the convolutional layer is replaced in the third circuit section 103C of FIG. 6 by a fully connected layer 1035. The fully connected layer 1035, which receives the (multi-valued) output signal from the max pooling layer 1040, comprises a (fixed) number of units or neurons, each one computing the same operations.

The operations carried out by the units in the layer 1035 can be summarized by the following equation:

$$y_u = \sum_i \sum_j \sum_k x_{ijk} W_{ijk}$$

where $x_{ijk}$ represents the input sample organized in a three-dimensional matrix, i, j and k represent the indices of the sample elements, $W_{ijk}$ represents the corresponding (two-valued) weights and $y_u$ represents the output of a single unit, working in parallel with the others, of the fully connected layer.

Even though the weights applied are two-value enumerated, the parameters for use in this stage may take most of the memory size (e.g., about 80%) insofar as each neuron embodies a number of parameters equal to the input signal values.

The output of the layer 1035 is a vector with a length equal to the number of units considered, which is supplied to a normalization layer 1036 (e.g., again subtracting a mean value as discussed previously for the layer 1032 in the first section 103A) followed by a two-valued function/circuit 1037 which produces, starting from an Nbit signal, a 1 bit, two-valued signal.

It will be otherwise appreciated that, while not mandatory, the normalization blocks 1032, 1036 may be helpful, e.g., in terms of dynamic of the network nodes.

A classifier 1038, such as, for instance, a SoftMax classifier (see, e.g., a website represented as <<https:>> <</>> <</>> <<en.wikipedia.org>> <</>> <<wiki>> <</>> <<Softmax function>>), as the last stage of the third section 103C may then produce, from the two-valued output of the circuit 1037, an output signal OS to be supplied to the error removal/correction filters 104 and 105.

In one or more embodiments, in this section input activations may not be enumerated with two-values.

The input to the classifier (e.g., SoftMax) layer 1038, in the case exemplified, is the output vector of the previous stage 1037, therefore each unit in this layer implements an equation of the type:

$$P(y = j \mid x) = \frac{e^{x^T w_j}}{\sum_{k=1}^{K} e^{x^T w_k}}$$

That is the predicted probability for the j-th class given a sample input vector x (that is the output of 1037) and a weighting vector w, learnt during an (e.g., off-line) training phase, and where the index K represents the number of inputs.

The (multi-valued) output OS from this last stage 1038 represents, e.g., the probability of the input signal x (on the left of FIG. 3) belonging to a certain output class, therefore the number of units of the SoftMax layer corresponds to the number of output classes. The units of this layer hold in memory less parameters than the other layers and require less operations.

A hybrid neural network as exemplified herein has demonstrated the ability of detecting five human activities with high precision, using a small number of operations and limited memory. Accuracy is illustrated through confusion matrices.

Table 1 reports measured results on an in-house created dataset DB (Dataset version 1.6) which stores 3 axial accelerations at 16 Hz as a result of several human activities, manually annotated to generate the ground truth association between input signals x (FIG. 3, left hand) and output classes C (FIG. 3, right hand).

TABLE 1

Confusion matrix obtained with hybrid neural network
with No. of filters = 8; Fully connected units
FC 1 = 64; max Pooling = (4, 1); Average Recall = 97.513

|  | Predicted Stationary | Predicted Walking | Predicted Running | Predicted Biking | Predicted Driving |
|---|---|---|---|---|---|
| Stationary | 98.383 | 0.000 | 0.000 | 0.013 | 1.617 |
| Walking | 0.000 | 99.280 | 0.411 | 0.309 | 0.000 |
| Running | 0.000 | 2.531 | 97.175 | 0.220 | 0.073 |
| Biking | 2.538 | 0.887 | 0.000 | 94.924 | 1.651 |
| Driving | 0.000 | 0.000 | 0.000 | 2.199 | 97.801 |

Tables 2 and 3 below reports the confusion matrices of Courbariaux's MLP and ConvNet, respectively.

TABLE 2

Confusion matrix obtained for Courbariaux's MLP Model
on Dataset 1.6. Average recall = 54.826%

|  | Predicted Stationary | Predicted Walking | Predicted Running | Predicted Biking | Predicted Driving |
|---|---|---|---|---|---|
| Stationary | 98.217 | 0.000 | 0.000 | 0.000 | 1.783 |
| Walking | 0.000 | 100.000 | 0.000 | 0.000 | 0.000 |
| Running | 0.000 | 99.725 | 0.000 | 0.202 | 0.073 |
| Biking | 1.322 | 55.693 | 0.000 | 33.739 | 9.247 |
| Driving | 57.218 | 0.000 | 0.000 | 0.610 | 42.173 |

TABLE 3

Confusion matrix obtained for Courbariaux's ConvNet Model
on Dataset 1.6. Average recall = 76.270%

|  | Predicted Stationary | Predicted Walking | Predicted Running | Predicted Biking | Predicted Driving |
|---|---|---|---|---|---|
| Stationary | 99.414 | 0.000 | 0.420 | 0.000 | 0.166 |
| Walking | 0.000 | 12.944 | 87.056 | 0.000 | 0.000 |
| Running | 0.018 | 1.119 | 98.844 | 0.000 | 0.018 |
| Biking | 2.423 | 0.559 | 9.025 | 87.151 | 0.843 |
| Driving | 11.713 | 0.000 | 3.832 | 1.459 | 82.996 |

Table 4 below provides some data on the complexity of a hybrid neural network according to embodiments.

TABLE 4

| Complexity data | | | |
|---|---|---|---|
| Layer | Parameters [bytes] | Operations per window* | Parallel Op. |
| Conv 1 1031 | (8 × 5)/8 = 5 | 5 × (20 × 3 × 8) = 2400 ADD | 20 × 3 × 8 |
| Norm 1 1032 | Mean: (8 × 16)/ 8 = 16 | (20 × 3 × 8) = 480 SUB | 20 × 3 × 8 |
| Conv 2 1034 | (8 × 8 × 5)/ 8 = 40 | 5 × 8 × (16 × 3 × 8) = 15360 ADD | 16 × 3 × 8 |
| Max pool layer 1040 | / | 3 × (4 × 3 × 8) = 576 SUB + COMP | 4 × 3 × 8 |
| FC 1st stage 1035 | (8 × 4 × 3 × 64)/8 = 768 | 64 × (4 × 3 × 8) = 6144 ADD | 64 |
| Norm 2 1036 | Mean: (64 × 16)/ 8 = 128 | 64 SUB | 64 |
| FC 2 | (64 × 5)/ 8 = 40 | 64 × 5 = 320 ADD | 5 |
| SoftMax 1038 | | | |
| TOT | 997 | 25344 (*)per second @16 Hz if window is shifted by 16 samples | / |

As shown in Table 4, only 1 Kbyte of parameters may be stored in memory and about 25,000 operations (sums and subtractions) are carried out, assuming 3-axial acceleration acquired at 16 Hz.

The rightmost column in Table 4 also reports the notional inner parallelism available for each layer of the hybrid neural network 103.

The average accuracy obtained was 97.513%, while the (best) validation error was 5.98%.

By way of comparison, accuracy measured using the Courbariaux models was 54.826 and 76.27%, while the validation error rate does not fall below 16%. Therefore, even if all multiply-accumulations are replaced with 1-bit XNOR-count operations, thus reducing complexity, the accuracy of the state of the art algorithms (Courbariaux's MLP and ConvNet) is largely lower than the accuracy which may be achieved with one or more embodiments.

It is otherwise noted that a digital implementation of one or more embodiments is advantageous, as this will be adapted to run, e.g., at 25 kHz or lower by exploiting the inner parallelism of each layer.

Table 5 summarizes further differences between a hybrid neural network (HNN) according to embodiments and Courbariaux's MLP and ConvNet pipeline stages.

A first difference is that one or more embodiments do not require replication of a well-defined group of layers as is the case of conventional solutions such as MLP and ConvNet.

Another difference is that one or more embodiments as exemplified herein do not involve batch normalization after max pooling and an enumeration with two-values before a fully connected layer.

Still another difference lies in the ability of one or more embodiments of benefitting from both pre-processing (e.g., the input filter 101 and the gravity rotation 102) and post-processing (e.g., the temporal filter 104, suited for processing acceleration, while Courbariaux's MLP and ConvNet (discussed previously) are conceived for image processing and not for processing acceleration signals: therefore they are applied to pixels do not deal with gravity-related pre-processing as implemented, e.g., in stages 101 and 102.

Furthermore, one or more embodiments can use a Soft-Max classification layer with weights each one enumerated with two values.

TABLE 5 differences between embodiments (HNN) and MLP and ConvNet pipeline stages.

| Courbariaux MLP 54.8% | Courbariaux ConvNet 76.3% | HNN 97.5% |
|---|---|---|
| FC | Conv | IIr or EMA - 101 |
| BN | BN | GR - 102 |
| B (FC, BN and B repeated N times) | B | Conv - 1031 |
| FC | Conv | N - 1032 |
| BN | MP | TVE - 1033 |
| EMA = Exponential moving average | BN | Conv - 1034 |
| IIR = Infinite Impulse Response | B (Conv, BN, B, Conv, MP, BN, B repeated 3 times) | MP - 1040 |
| GR = Gravity rotation | | |
| TVE = Two-value enumeration | FC | FC - 1035 |
| (N bits >>> 1 bit) | BN | N - 1036 |
| BN = Batch Normalization | B (FC, BN, B repeated 2 times) | TVE - 1037 |
| N = Normalization | FC | SM - 1038 |
| MP = Max Pooling | BN | TF - 104 |
| FC = Fully Connected | | HF - 105 |
| Conv = Convolutional | | |
| SM = SoftMax | | |
| TF = Temporal Filter | | |
| HF = Heuristic Filter | | |

One or more embodiments may significantly reduce the set of possible output values.

For instance, in the case of the SoftMax layer 1038 at the end of the network, the number of distinct values is (n_inputs×n_outputs×2), where, e.g., n_input=128 is the number of hidden binary states and n_outputs=5 is the number of recognized classes.

A discretization of output values is thus indicative of the possible activation and weight enumeration with two-values according to embodiments. Also, two-valued enumeration patterns (e.g., +1/−1) applied (by way of testing) as an input (AS) may correspondingly restrict the number of distinct values processed in the first convolutional layer (e.g., 1031) and affect the statistics of activations in (all) subsequent layers.

One or more embodiments may feature a range of a few kHz, a low memory footprint (e.g., 1 KB) which, associated with multiplier-less circuits, enables a (very) low-frequency implementation as depicted in FIG. 7 at system in package type of chip.

FIG. 7 exemplifies the possibility of integrating an accelerometer A 702 and an (optional) gyroscope G 704 in a same package CP together with an associated pipeline 100—comprising a hybrid neural network 100 (e.g., all the blocks in FIG. 3) as exemplified herein—for processing the signals produced thereby.

For example, the accelerometer A may produce samples of three-axis acceleration at a certain frequency (e.g., 16 Hz) that feed the pipeline 100, whose output is an index $C_1$ $C_2 \ldots C_N$ to a class of recognized human activity (e.g., walking, running, biking etc.).

Figure 8:
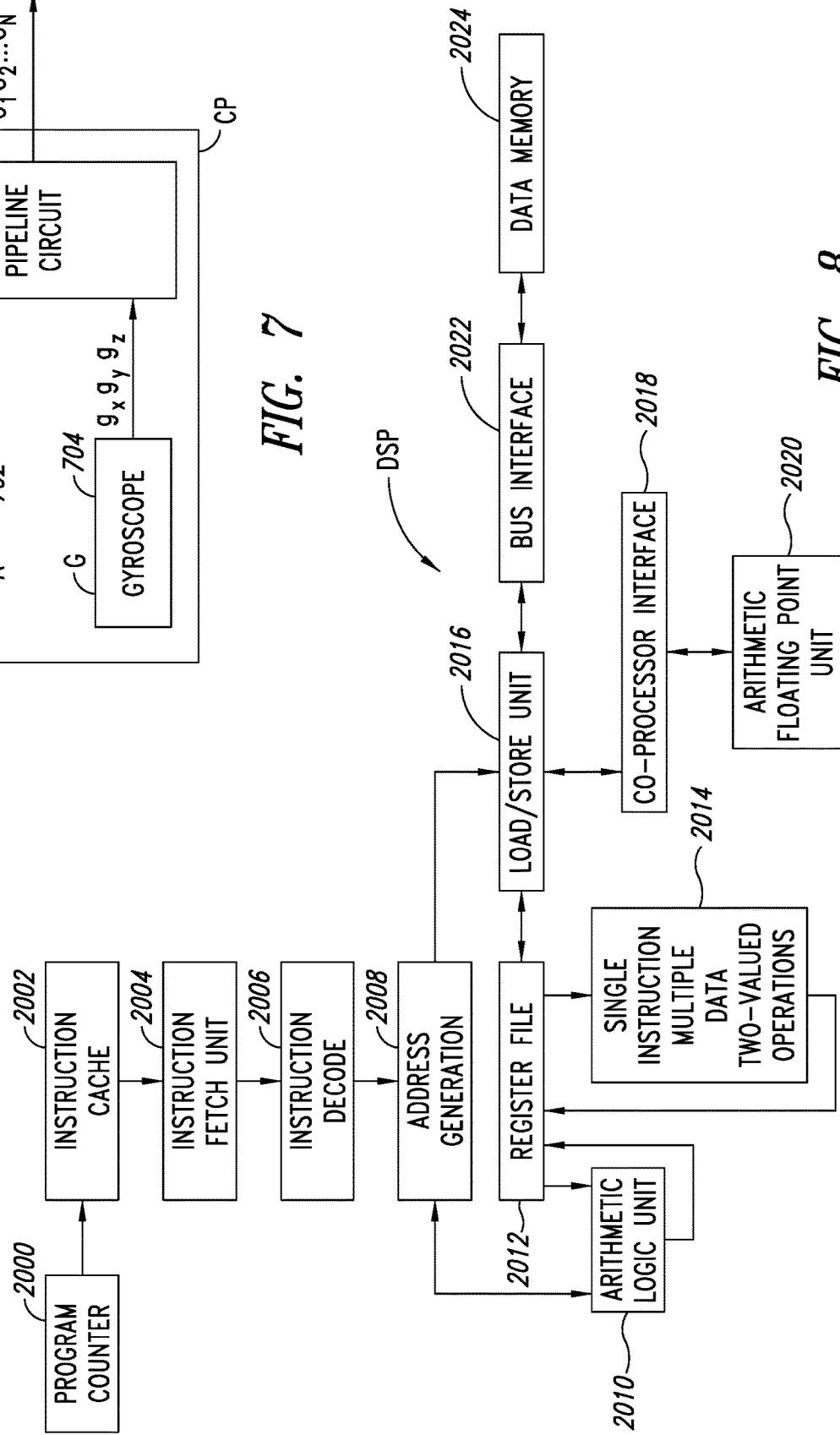
FIG. 8 is a block diagram exemplary of a possible arrangement of circuit blocks in embodiments.

The pipeline 100 can be implemented on a digital signal processor according to a general layout as exemplified in FIG. 8.

The following designations may apply to the blocks illustrated in FIG. 8:
- 2000: program counter
- 2002: instruction cache
- 2004: instruction fetch unit
- 2006: instruction decode
- 2008: address generation
- 2010: arithmetic logic unit
- 2012: register file
- 2014: single instruction multiple data two-valued operations
- 2016: load/store unit
- 2018: co-processor interface
- 2020: arithmetic floating point unit
- 2022: bus interface
- 2024: data memory A processor as exemplified in FIG. 8 features logic to implement parallel two-valued operations using the single instruction multiple (two-valued) data instruction set (e.g., 2014).

A coprocessor floating point unit (see, e.g., the interface 2018) can optionally accelerate pre- and post-processing operations (for example, 101, 102 in FIG. 3) that benefit from such a precision while operating at the same data-rate (for example 16 Hz) as the accelerometer sensor output data-rate.

A typical power dissipation figure of such a digital signal processor (e.g., as in the STREW™ family of processors available with the assignee company) can be as low as 20 μW per MHz with 90 nm technology (eembc benchmark see, e.g., a website represented as <<http:>> <</>> <</>> <<www>> <<.>> <<eembc.org>> <</>>).

A non-parallelized implementation at 25 kHz may involve a power consumption of about 0.5 μW. A pipeline spreading intermediate calculations, in a parallel implementation, for each input acceleration sample may turn out to be (at least) ⅓ less complex (e.g., 16 kHz) while a ×2 parallel implementation can be operated at about 8 kHz, if not even lower. This corresponds to power consumption figures at least three times lower (conservatively) than the one achieved by current sensor solutions such as LIS2DW12 (e.g., 1.1 μA (ODR=12.5 Hz) in active low-power mode with a minimum power supply of 1.62 V) available with the assignee company.

This facilitates producing ultra-low-power high-performance three-axis (linear) A.I. accelerometers.

While FIG. 7 exemplifies a possible integration in a same package CP of the accelerometer A/gyroscope G with the associated processing pipeline 100, one or more embodiments as exemplified in FIG. 9 may comprise the accelerometer A 902/gyroscope G 904 integrated in a first chip package CP1 together with an output stage OS for providing acceleration signals $\alpha_x$, $\alpha_y$, $\alpha_z$ (possibly with associated gyroscopic signals $g_x$, $g_y$, $g_z$) to a second chip package CP2 where the pipeline 100 is implemented in a DSP with an associated microcontroller unit—MCU such as a STM32 processor as available with the assignee company.

The following designations may apply to the blocks illustrated in FIG. 9:

300: digital signal processor—DSP
302: host central processing unit—CPU
304: on-chip memory (e.g., RAM, ROM, FLASH)
306: memory controller
308: off-chip RAM memory
310: memory controller
312: off-chip ROM/FLASH memory.

An approach as exemplified in FIG. 9 may facilitate discharging the MCU from a low frequency task that might cause the MCU (actually designed to run at much higher frequencies, such as tens or hundreds of MHz) to be kept in an active mode running at a minimum (for example 2) MHz rate, rather than being switched to a deep sleep mode, while the neural network pipeline is executed by the DSP, further reducing the power consumption of the system.

In one or more embodiments, a method may comprise:
receiving an input signal (e.g., AS, possibly obtained by pre-processing a "raw" signal x) and applying (artificial) neural network processing (e.g., 103) to the input signal to produce an output signal (e.g., OS) therefrom, wherein the neural network processing comprises:
first neural network processing (e.g., 103A) comprising first convolutional layer processing (e.g., 1031), wherein two-valued weights are applied to the input signal, and (possibly after normalization at 1032) a two-valued function (e.g., 1033) to produce a two-valued signal from the result of the first convolutional layer processing,
second neural network processing (e.g., 103B) comprising further convolutional layer processing (e.g., 1034) applied to the two-valued signal from the first neural network processing with two-valued weights and (two-valued) activations, and
third neural network processing (e.g., 103C) comprising fully connected layer processing (e.g., 1035), wherein two-valued weights are applied to the signal from the second neural network processing, and (possibly after normalization at 1036) a respective two-valued function (e.g., 1037) to produce a two-valued signal from the result of the fully connected layer processing, and classifier processing (e.g., 1038) to produce said output signal from the two-valued signal from the respective two-valued function.

One or more embodiments may comprise applying normalization (e.g., at 1032 and/or 1036) to:
the output from the first convolutional layer processing fed to the two-valued function in the first neural network processing, and/or
the output from the fully connected layer processing fed to the respective two-valued function in the third neural network processing.

In one or more embodiments, the first convolutional layer processing in the first neural network processing may comprise applying a set of filters to the input signal and returning respective filtered outputs (e.g., ASxM).

In one or more embodiments, the second convolutional layer processing in the second neural network processing may comprises applying a set of filters to the signal from the first neural network processing and adding together (e.g., 103a) the outputs from the filters in the set of filters to provide respective single values (e.g., $y_1$, $y_2$, . . . , $y_C$) for processing in the third neural network processing.

In one or more embodiments, the second neural network processing may comprise max pooling processing (e.g., 1040) of the result of the second convolutional layer processing.

In one or more embodiments, classifier processing in the third neural network processing may comprise softmax classifier processing.

One or more embodiments may comprise applying neural network processing to an input signal pre-processed by at least one of:
filtering (e.g., 101) to separate a dynamic acceleration component from gravity, and/or
gravity rotation (e.g., 102).

In one or more embodiments, filtering to separate a dynamic acceleration component from gravity may comprise one of infinite impulse response filtering or exponential moving averaging.

One or more embodiments may comprise post-processing (e.g., 104, 105) the output signal from the neural network processing by at least one of:
temporal filtering (e.g., 104) to remove mis-classification errors, and/or
heuristic filtering (e.g., 105) to correct systematic prediction errors and/or to correct transition between classification classes.

In one or more embodiments, a system (e.g., 100) may comprise an (artificial) neural network circuit (e.g., 103) having first (e.g., 103A), second (e.g., 103B) and third (e.g., 103C) neural network circuit blocks, wherein:
the first neural network circuit block comprises a first convolutional layer, wherein two-valued weights are applied to the input signal, and a two-valued circuit to produce a two-valued signal from the result of the first convolutional layer,
the second neural network circuit block comprises a further convolutional layer active on the signal from the first neural network processing with two-valued weights and (two-valued) activations, and
the third neural network circuit block comprises a fully connected layer, wherein two-valued weights are applied to the signal from the second neural network circuit block, a respective two-valued circuit to produce a two-valued signal from the result of the fully connected layer (1035), and a classifier to produce an output signal (OS) from the two-valued signal from the respective two-valued function,
wherein the first, second and third neural network circuit blocks are configured to operate with the method of one or more embodiments.

One or more embodiments may comprise pre-processing circuitry of the input signal (e.g., x>>>>AS) applied to said neural network circuit, the pre-processing circuitry comprising at least one of:
a filter (e.g., 101) to separate a dynamic acceleration component from gravity, and/or
a gravity rotator (e.g., 102).

One or more embodiments may comprise post-processing circuits (e.g., 104, 105) of the output signal (OS) from the neural network circuit, the post-processing circuitry comprising at least one of:
a temporal filter (e.g., 104) to remove mis-classification errors, and/or
a heuristic filter (e.g., 105) to correct systematic prediction errors and/or to correct transition between classification classes.

One or more embodiments may comprise both the temporal filter and the heuristic filter with the heuristic filter downstream of the temporal filter.

One or more embodiments may comprise:
- at least one sensor (e.g., A, G) providing said input signal, and
- a processing pipeline (e.g., 100) implementing said neural network circuit having first, second and third neural network circuit blocks.

In one or more embodiments, the at least one sensor and the processing pipeline may be integrated in a single chip (e.g., CP).

In one or more embodiments, the at least one sensor and the processing pipeline may be integrated in distinct chips (e.g., CP1, CP2).

In one or more embodiments, the at least one sensor may comprise one of:
- an accelerometer, or
- the combination of an accelerometer and a gyroscope.

One or more embodiments may comprise a computer program product loadable in the memory (e.g., 304, 308, 312) of at least one processing circuit (e.g., 300, 302) and comprising software code portions for executing the steps of the method of one or more embodiments when the product is run on at least one processing circuit.

Without prejudice to the underlying principles, the details and embodiments may vary, even significantly, with respect to what has been described by way of example only, without departing from the extent of protection.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
applying, in a first convolutional layer of a neural network, two-valued weights of the first convolutional layer to an input signal received via a first input of the first convolutional layer to produce a first output signal;
applying, in a first normalization layer of the neural network wherein a second input of the first normalization layer directly receives the first output signal from a first output of the first convolutional layer, normalization of the first output signal directly from the first convolutional layer to produce a second output signal;
applying, in a first two-valued function layer of the neural network wherein a third input of the first two-valued function layer directly receives the second output signal from a second output of the first normalization layer, a two-valued function of the first two-valued function layer to the second output signal directly from the first normalization layer to produce a third output signal;
applying, in a second convolutional layer of the neural network wherein a fourth input of the second convolutional layer directly receives the third output signal from a third output of the first two-valued function layer, weights of the second convolutional layer to the third output signal directly from the first two-valued function layer to produce a fourth output signal;
applying, in a max pooling layer of the neural network wherein a fifth input of the max pooling layer directly receives the fourth output signal from a fourth output of the second convolutional layer, max pooling to the fourth output signal directly from the second convolutional layer to produce a fifth output signal;
applying, in a fully-connected layer of the neural network wherein a sixth input of the fully-connected layer directly receives the fifth output signal from a fifth output of the max pooling layer, two-valued weights of the fully connected layer to the fifth output signal directly from the max pooling layer to produce a sixth output signal;
applying, in a second normalization layer of the neural network wherein a seventh input of the second normalization layer directly receives the sixth output signal from a sixth output of the fully-connected layer, normalization to the sixth output signal directly from the fully-connected layer to produce a seventh output signal;
applying, in a second two-valued function layer of the neural network wherein an eighth input of the second two-value function layer directly receives the seventh output signal from a seventh output of the second normalization layer, a two-valued function of the second two-valued function layer to the seventh output signal directly from the second normalization layer to produce an eighth output signal; and
classifying, using a classifier of the neural network wherein a ninth input of the classifier receives the eighth output signal from an eighth output of the second two-valued function layer, the input signal based on the eighth output signal directly from the second two-valued function layer.

2. The method of claim 1, wherein the applying two-valued weights in the first convolutional layer comprises applying a set of filters to the input signal, thereby generating respective filtered output signals.

3. The method of claim 1, wherein the applying weights in the second convolutional layer comprises applying a set of filters to the third output signal from the first two-valued function layer and the method comprises, in the second convolutional layer, adding together outputs from the filters in the set of filters, generating respective single values.

4. The method of claim 1, wherein the classifying comprises applying softmax classification.

5. The method of claim 1, comprising:
applying pre-neural network processing to an acceleration signal, thereby generating the input signal of the first convolutional layer, the pre-neural network processing including filtering to separate a dynamic acceleration component from a gravity component of the acceleration signal.

6. The method of claim 5, wherein the filtering to separate the dynamic acceleration component from the gravity component comprises one of infinite impulse response filtering or exponential moving averaging.

7. The method of claim 5 wherein the pre-neural network processing includes:
applying a gravitational rotation to the filtered acceleration signal.

8. The method of claim 1, comprising:
applying post-neural network processing to an output of the classifier, the post-neural network processing including at least one of:
temporal filtering to remove mis-classification errors; and
heuristic filtering.

9. The method of claim 1 wherein the weights of the second convolutional layer are two-valued weights.

10. A computing device, comprising:
neural network circuitry;
a first convolutional layer of the neural network circuitry having a first input and a first output, which, in operation, applies two-valued weights of the first convolutional layer to produce a first output signal;
a first normalization layer of the neural network circuitry having a second input and a second output—the second input configured to directly receive the first output signal from the first output of the first convolutional layer, wherein the first normalization layer, in operation, normalizes the first output signal directly from the first convolutional layer to produce a second output signal;
a first two-valued function layer of the neural network circuitry having a third input and a third output—the third input configured to directly receive the second output signal from the second output of the first normalization layer, wherein the first two-valued function layer, in operation, applies a two-valued function of the first two-valued function layer to the second output signal directly from the first normalization layer to produce a third output signal;
a second convolutional layer of the neural network circuitry having a fourth input and a fourth output—the fourth input configured to directly receive the third output signal from the third output of the first two-valued functional layer, wherein the second convolutional layer, in operation, applies weights of the second convolutional layer to the third output signal directly from the first two-valued function layer to produce a fourth output signal;
a max pooling layer of the neural network circuitry having a fifth input and a fifth output—the fifth input configured to directly receive the fourth output signal from the fourth output of the second convolutional layer, wherein the max pooling layer, in operation, applies max pooling to the fourth output signal directly from the second convolutional layer to produce a fifth output signal;
a fully-connected layer of the neural network circuitry having a sixth input and a sixth output—the sixth input configured to directly receive the fifth output signal from the fifth output of the max pooling layer, wherein the fully connected layer, in operation, applies two-valued weights of the fully connected layer to the fifth output signal directly from the max pooling layer to produce a sixth output signal;
a second normalization layer of the neural network circuitry having a seventh input and a seventh output—the seventh input configured to directly receive the sixth output signal from the sixth output of the fully connected layer, wherein the second normalization layer, in operation, normalizes the sixth output signal directly from the fully-connected layer to produce a seventh output signal;
a second two-valued function layer of the neural network circuitry having an eighth input and an eighth output—the eighth input configured to directly receive the seventh output signal from the seventh output of the second normalization layer, wherein the second two-valued function layer, in operation, applies a two-valued function of the second two-valued function layer to the seventh output signal directly from the second normalization layer to produce an eighth output signal; and
a classifier of the neural network circuitry having a ninth input configured to directly receive the eighth output signal from the eighth output of the second two-valued function layer, wherein the classifier, in operation, classifies an input signal to the first input of the first convolutional layer based on the eighth output signal directly from the second two-valued function layer.

11. The computing device of claim 10 wherein the first convolutional layer comprises a set of filters, which, in operation, generate respective filtered signals.

12. The computing device of claim 10 wherein the second convolutional layer comprises a set of filters coupled to an adder.

13. A system, comprising:
an input interface; and
digital signal processing circuitry, coupled to the input interface, wherein the digital signal processing circuitry, in operation, implements a neural network comprising:
a first convolutional layer, which, in operation, applies two-valued weights to an input signal received via the input interface to produce a first output;
a first normalization layer directly coupled to the first convolutional layer, which, in operation, normalizes the first output directly received from the first convolutional layer to produce a second output;
a first two-valued function layer directly coupled to the first normalization layer, which, in operation, applies a first two-valued function to the second output directly received from the first normalization layer to produce a third output;
a second convolutional layer directly coupled to the first two-valued function layer, which, in operation, applies weights to the third output directly received from the first two-valued function layer to produce a fourth output;

a max pooling layer directly coupled to the second convolutional layer, which, in operation, applies max pooling to the fourth output directly received from the second convolutional layer to produce a fifth output;

a max pooling layer directly coupled to the second convolutional layer, which, in operation, applies max pooling to the fourth output directly received from the second convolutional layer to produce a fifth output;

a fully-connected layer directly coupled to the max pooling layer, which, in operation, applies two-valued weights to the fifth output directly received from the max pooling layer to produce a sixth output;

a second normalization layer directly coupled to the fully-connected layer, which, in operation, normalizes the sixth output directly received from the fully-connected layer to produce a seventh output;

a second two-valued function layer directly coupled to the second normalization layer, which, in operation, applies a two-valued function to the seventh output directly received from the second normalization layer to produce an eighth output; and a classifier directly coupled to the second two-valued function layer, which, in operation, classifies the input signal received via the input interface based on the eighth output directly received from the second two-valued function layer.

14. The system of claim 13, comprising:
pre-neural network processing circuitry coupled to the input interface, the pre-neural network processing circuitry including a filter and a gravitational rotator.

15. The system of claim 13, comprising:
post-neural network processing circuitry coupled to the input interface, the post-neural network processing circuitry including a temporal filter and a heuristic filter.

16. The system of claim 13, comprising:
an accelerometer.

17. The system of claim 16, comprising:
a gyroscope.

18. The system of claim 16, comprising a chip including the digital signal processing circuitry and the accelerometer.

19. A non-transitory computer-readable medium having contents which configure digital signal processing circuitry to implement a neural network, the neural network comprising:

a first convolutional layer which, in operation, applies two-valued weights to an input signal;

a first normalization layer directly coupled at a first input to a first output of the first convolutional layer, and which, in operation, normalizes the first output;

a first two-valued function layer directly coupled at a second input to a second output of the first normalization layer, and which, in operation, applies a first two-valued function to the second output;

a second convolutional layer directly coupled at a third input to a third output of the first two-valued function layer, and which, in operation, applies weights to the third output;

a max pooling layer directly coupled at a fourth input to a fourth output of the second convolutional layer, and which, in operation, applies max pooling to the fourth output;

a fully-connected layer directly coupled at a fifth input to a fifth output of the max pooling layer, and which, in operation, applies two-valued weights to the fifth output;

a second normalization layer directly coupled at a sixth input to a sixth output of the fully-connected layer, and which, in operation, normalizes the sixth output;

a second two-valued function layer directly coupled at a seventh input to a seventh output of the second normalization layer, and which, in operation, applies a two-valued function to the seventh output; and a classifier coupled at an eighth input to an eighth output of the second two-valued function layer, and which, in operation, classifies the input signal based on the eighth output of the second two-valued function layer.

20. The non-transitory computer-readable medium of claim 19 wherein the contents comprise instructions executed by the digital signal processing circuitry.

21. The non-transitory computer-readable medium of claim 20 wherein the instructions, when executed by the digital signal processing circuitry, cause the digital signal processing circuitry to filter the input signal provided to the first convolutional layer.

* * * * *